United States Patent [19]

Vitellaro

[11] 4,203,476

[45] May 20, 1980

[54] WIRE REINFORCED HOSE

[75] Inventor: Frank A. Vitellaro, Trenton, N.J.

[73] Assignee: Dayco Corporation, Dayton, Ohio

[21] Appl. No.: 1,126

[22] Filed: Jan. 5, 1979

[51] Int. Cl.² .......................................... F16L 11/08
[52] U.S. Cl. .................................. 138/122; 138/129;
138/133; 138/154; 156/143; 156/170
[58] Field of Search ...................... 156/143, 171, 170;
138/122, 129, 134, 135, 154, 132, 133

[56] References Cited

U.S. PATENT DOCUMENTS

| | | | |
|---|---|---|---|
| 2,354,485 | 7/1944 | Slaughter | 138/129 X |
| 2,452,047 | 10/1948 | Hamblin | 138/133 |
| 2,740,427 | 4/1956 | Swan | 138/122 |
| 2,874,723 | 2/1959 | Kahn | 138/133 |
| 2,890,264 | 6/1959 | Duff | 138/122 X |
| 3,112,771 | 12/1963 | Bringolf | 138/122 X |
| 3,192,088 | 6/1965 | LaRivierre | 156/171 X |
| 3,211,823 | 10/1965 | Brown et al. | 138/122 X |
| 3,674,056 | 7/1972 | D'Aprile | 138/129 X |
| 3,739,815 | 6/1973 | Rejeski | 138/122 |
| 3,919,026 | 11/1975 | Mizutani et al. | 138/122 X |
| 4,140,154 | 2/1979 | Kanao | 138/122 X |

Primary Examiner—Richard E. Aegerter
Assistant Examiner—James E. Bryant, III
Attorney, Agent, or Firm—Reuben Wolk

[57] ABSTRACT

A wire-reinforced hose is provided wherein such hose is defined of a helically wound strip which has at least one integral preformed convolution therein and a wire disposed in the convolution with the helical winding being such that the convolution with the wire disposed therewithin extends in a helical path along the length of the hose and the hose has a tubular inside surface with the helical wire concealed therewithin when viewing such tubular inside surface.

11 Claims, 12 Drawing Figures

WIRE REINFORCED HOSE

BACKGROUND OF THE INVENTION

1. Field of the Invention

This invention relates to wire-reinforced flexible hose made primarily of polymeric material and a method of making such hose.

2. Prior Art Statement

It is known in the art to provide a wire reinforced hose defined by a helically wound strip of pliable material which has adjoining turns thereof with portions in overlapping relation and a reinforcing wire sandwiched between such portions, and examples of such a hose are disclosed in U.S. Pat. Nos. 2,539,853; 3,219,738; 3,336,172; and 3,739,815. However, with the hose disclosed in each of these patents it appears that a flat strip or tape of pliable material is wound against a reinforcing wire while supporting such wire on a support. With such a flat strip there is generally some relative movement between the strip and wire during manufacture whereby the wire is not usually wound with optimum precision whereby the overall quality of the resulting hose is impaired. In addition, with the hose disclosed in each of these patents there is a tendency in the completed hose for separation and relative movement between the strip and wire often resulting in premature weakening and failure of the hose.

It is also known to provide wire-reinforced hose comprised of a helically wound wire and so-called preformed profiled tape, such as tape of roughly M-shaped cross-sectional configuration, for example, which is helically wrapped around the wire; and, an example of such a hose is disclosed in U.S. Pat. No. 3,089,535. However, with this hose the helical convolutions defined in the hose are inherently double thickness convolutions which result in excessive use of material and the inside surface of the resulting hose has a comparatively rough corrugated shape with the helically coiled wire exposed.

SUMMARY

It is a feature of this invention to provide a wire-reinforced hose and method of making same defined by a helically wound strip of pliable material which has a flat side portion adjoined by a convoluted side portion having an integral preformed convolution therein and a helically wound reinforcing wire wherein the resulting hose has a substantially smooth tubular inside surface defined solely by adjoining turns of the flat side portion of the strip.

Another feature of this invention is to provide a wire-reinforced hose wherein the wire reinforcement is defined by at least one helically wound reinforcing wire which is held in a precise helical path by a preformed convolution comprising a helically wound strip of pliable material employed to define such hose.

Another feature of this invention is to provide a wire-reinforced hose of the character mentioned having a substantially smooth tubular inside surface and being defined by a helically wound strip of pliable material and wherein such hose is reinforced by a plurality of helically wound wires which may serve as dual-purpose reinforcing wires and electrical conductors.

Another feature of this invention is to provide a wire-reinforced hose of the character mentioned which also has an integral reinforcing bead of solid semi-circular cross-sectional configuration extending in a helical path along the length thereof which cooperates with a helical wire reinforcement of such hose to increase its strength.

Another feature of this invention is to provide a wire-reinforced hose of the character mentioned wherein the reinforcing wire is made of a metallic material.

Another feature of this invention is to provide a wire-reinforced hose of the character mentioned wherein the reinforcing wire thereof is made of a non-metallic material.

Another feature of this invention is to provide a wire-reinforced hose of the character mentioned wherein the strip of pliable material employed to define the hose is a strip of ethylene-propylene terpolymer (EPDM) rubber.

Another feature of this invention is to provide a wire-reinforced hose of the character mentioned wherein the strip of polymeric material is self cured at normal ambient temperatures.

Another feature of this invention is to provide a wire-reinforced hose defined by a helically wound strip of pliable material which has adjoining turns thereof with portions in overlapping relation and a reinforcing wire sandwiched between the portions wherein the pliable material is a strip of polymeric material having a flat side portion adjoined by a convoluted side portion which has an integral preformed convolution therein, with the convolution defining a groove relative to one surface and a bead relative to an opposite surface thereof, and the wire is disposed in the groove with the strip in its helically wound relation, with the bead defining an integral helical bead along the hose, and the overlapping portions being defined by the convoluted side portion disposed in wound relation against the flat side portion with the wire sandwiched therebetween and disposed in the groove to thereby define the hose having a substantially smooth tubular inside surface defined solely by adjoining turns of the flat side portion with the wire being concealed when viewing the tubular inside surface.

Another feature of this invention is to provide an improved method of making a wire-reinforced hose of the character mentioned.

Therefore, it is an object of this invention to provide an improved wire-reinforced hose and method of making same having one or more of the novel features set forth above or hereinafter shown or described.

Other details, features, uses, objects, and advantages of this invention will become apparent from the embodiments thereof presented in the following specification, claims, and drawings.

BRIEF DESCRIPTION OF THE DRAWINGS

The accompanying drawings show present preferred embodiments of this invention, in which.

DESCRIPTION OF ILLUSTRATED EMBODIMENTS

Figure 1:
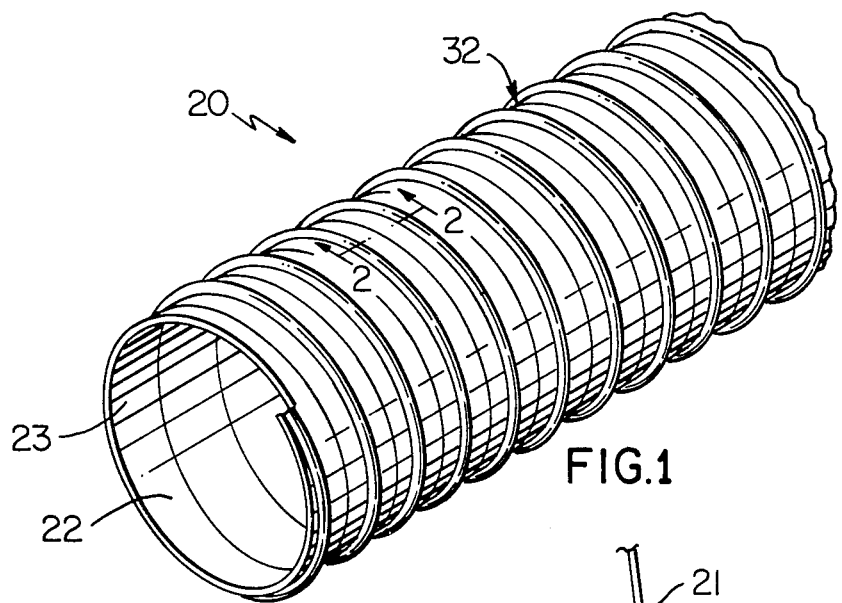
FIG. 1 is a fragmentary perspective view illustrating one exemplary embodiment of the wire-reinforced hose of this invention.

Reference is now made to FIG. 1 of the drawings which illustrates one exemplary embodiment of a wire-reinforced hose construction or hose of this invention which is designated generally by the reference numeral 20. The hose 20 is of optimum flexibility yet has considerable strength due to the wire-reinforcement thereof which is provided by a helically wound reinforcing wire 21 yet the hose has a substantially smooth tubular inside surface 22.

The hose 20 is defined by a helically wound strip 23 of pliable material which has adjoining turns thereof with portions in overlapping relation and as shown typically at 24 in FIG. 2 and these portions illustrated at 24 will be described in detail subsequently; however, basically such portions have the reinforcing wire 21 sandwiched therebetween. The pliable material comprising the strip 32 may be any suitable material and is preferably in the form of a polymeric material; and, in this example such polymeric material is a synthetic plastic material in the form of a thermoplastic material as indicated by crosshatching in the drawings.

The strip 23 has a flat inside portion 25, when viewed from an end thereof, and in the exemplary hose 20 of FIG. 1 portion 25 defines the major part of the width of the strip 23. The strip 23 also has a convoluted side portion 26 and such convoluted side portion has an integral preformed convolution 27 defined therein with the convolution defining a groove 30 relative to one surface of the strip, i.e., the surface defining the inside surface 22 of the hose; and such convolution defining a bead 31 relative to the opposite surface of the strip, i.e., the surface defining the outside surface of the hose 20 with such outside surface being designated generally by the reference numeral 32.

Figure 2:
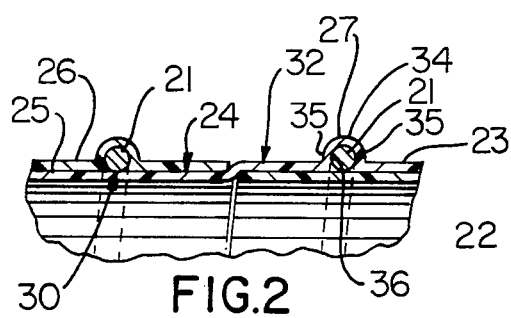
FIG. 2 is an enlarged fragmentary cross-sectional view taken essentially on the line 2—2 of FIG. 1.
Figure 3:
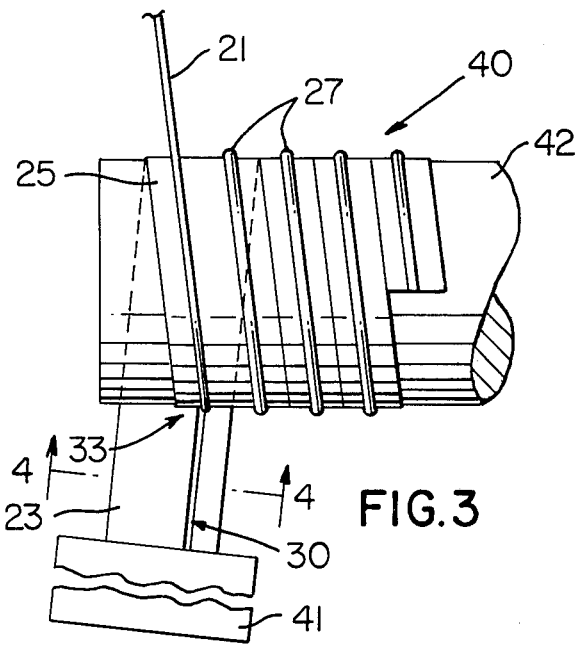
FIG. 3 is a view with parts in elevation, parts in cross section, and parts broken away illustrating the method of forming the hose of FIG. 1.
Figure 5:
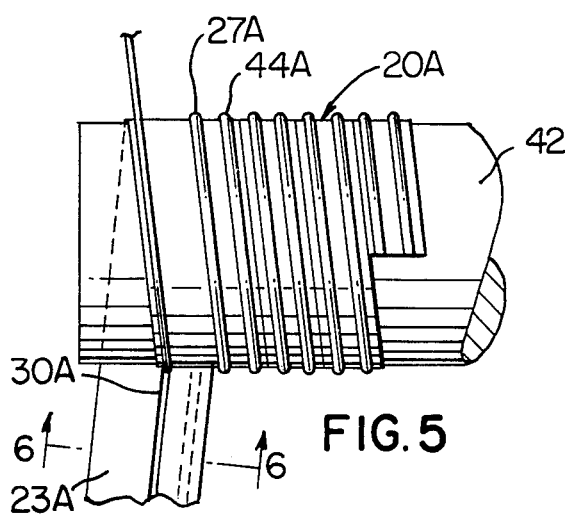
FIG. 5 is a view similar to FIG. 3 illustrating the manner of forming another exemplary embodiment of the hose of this invention.

As will be readily apparent from FIGS. 2 and 3 of the drawing, the wire 21 is disposed in the groove 30 with the strip 23 in its helically wound relation with the bead 31 defining an integral helical bead along the hose and in particular along the axial length of such hose. In addition, it is seen that the portions of the strip 23 in overlapping relation illustrated at 24 in FIG. 2 are defined by the convoluted side portion 26 disposed in wound relation against the flat side portion 25 with the wire 21 sandwiched therebetween and disposed in the groove 30 and as more clearly highlighted at 33 in FIG. 3. Accordingly, it is seen that the hose 20 has the previously mentioned substantially smooth tubular inside surface 22 which is defined solely by adjoining turns of the flat side portion 25; and, as will be readily apparent from FIGS. 1 and 2, the wire 21 is concealed when viewing the tubular inside surface 22.

As previously mentioned the strip 23 has a preformed convolution therein and although the strip 23 may be defined employing any suitable technique known in the art such strip is preferably defined by extrusion process. The preformed convolution has a roughly U-shaped cross-sectional configuration defined by a bight 34 and a pair of legs each designated by the same reference numeral 35 extending from opposite ends of the bight 34. The legs 35 have inside surfaces 36 which engage the wire 21 and hold such wire in a precise helical path once the strip 21 is helically wound with the wire 21.

The strip 23 preferably consists entirely of polymeric material and such polymeric material is preferably in the form of an ethylene-propylene terpolymer rubber (EPDM) which is self-cured at normal ambient temperatures; and, this reference to self-curing at normal ambient temperatures and the ambient temperature ranges considered as normal ambient will be described in detail subsequently. It will also be seen that the strip 23 preferably has a uniform thickness 37 throughout its entire width including its flat side portion 25 and its convoluted side portion 26.

The hose 20 may be made or formed employing any suitable technique or method known in the art; however, preferably such hose is defined employing the basic method steps illustrated in FIG. 3 with such method steps being designated generally by the reference numeral 40. In particular, the hose 20 is defined by helically winding strip 23 of pliable material with adjoining turns in overlapping relation and as illustrated at 33 in FIG. 3 and during the step of helically winding the strip 21 the reinforcing wire 21 is disposed in sandwiched relation between the portions disposed in overlapping relation.

In practicing the method of this invention such method comprises forming the strip 23 of pliable material in the form of a polymeric material such as EPDM as previously mentioned and although the forming step may be achieved employing any suitable technique known in the art such forming is achieved by extruding the strip employing a suitable extrusion apparatus which is designated generally by the reference numeral 41 in FIG. 3. The extrusion of the strip 23 results in the forming thereof to define the previously described flat side portion 25 and the convoluted side portion 26 which has the integral preformed convolution 27 therein.

Figure 4:
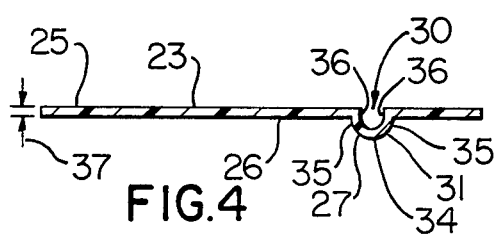
FIG. 4 is a cross-sectional view taken on the line 4—4 of FIG. 3.

The cross-sectional configuration of the strip illustrated in FIG. 4 is defined as is known in the art merely by providing the corresponding shape in an extrusion die opening of the extrusion apparatus 41 whereby the strip may be extruded from apparatus 41 continuously to enable the forming of hose 20 in a continuous manner. The extrusion of the strip 23 employing the extrusion apparatus 41 preforms the convolution 27 therein which has the previously described roughly U-shaped cross-sectional configuration defined by the bight 34 and a pair of legs 35 extending from opposite ends of the bight with the legs having inside surfaces 36 such that during the helically winding step the inside surfaces 36 engage the wire 21 and hold such wire in a precise helical path along the length of the hose 20.

The strip 23 is suitably supported during the helical winding thereof and although any suitable technique or apparatus known in the art may be employed for this purpose such strip is preferably supported by and wound around a rotatable mandrel 42.

Upon helically winding the strip 23 around the mandrel 42 the convolution 27 defines groove 30 relative to one surface thereof and the outer bead 31 relative to its opposite surface and during the helical winding step the wire 21 is disposed in the groove 30 with the bead defining an integral helical bead along the outside surface of the length of the hose 20. Further, the overlapping portions indicated at 24 defined during the winding of the convoluted side portion 26 against the flat side portion 25 of the strip define the hose having a substantially smooth tubular inside surface defined solely by adjoining turns of the flat side portion 25 with the wire 21 being concealed when viewing the tubular inside surface 22 of the hose 20 thus defined.

Other exemplary embodiments of the hose of this invention are illustrated in FIGS. 7, 8-9, and 12. The hose illustrated in FIGS. 7, 8-9, and 12 is similar to the hose 20; therefore, such hose will be designated by the reference numerals 20A, 20B, and 20C respectively and representative parts of each hose which are similar to corresponding parts of hose 20 are designated in the drawing by the same reference numeral as in the hose 20 (whether or not such representative parts are mentioned in the specification) followed by an associated letter designation either A, B, or C and not described again in detail. Only those component parts of each hose which are different from corresponding parts of the hose 20 will be designated by a new reference numeral also followed by the associated letter designation and described in detail.

Figure 6:
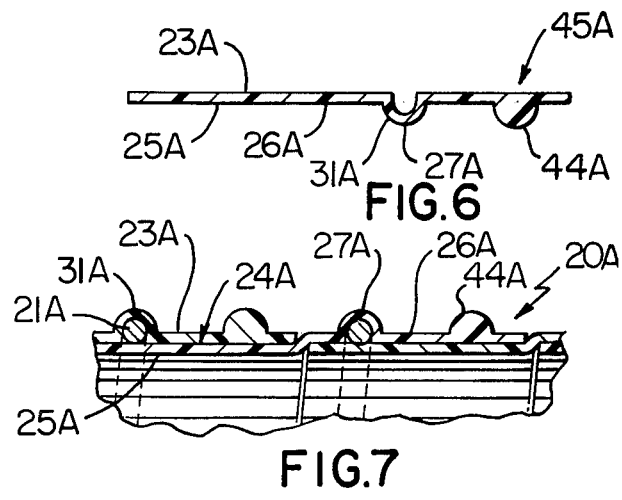
FIG. 6 is a cross-sectional view taken on the line 6—6 of FIG. 5.
Figure 7:
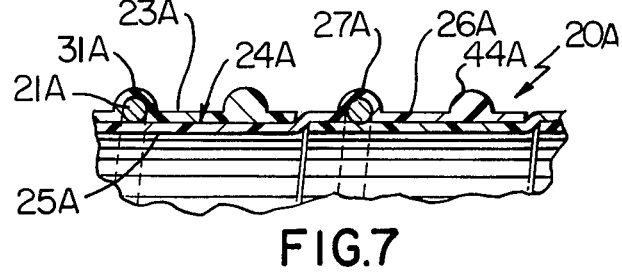
FIG. 7 is a view similar to FIG. 2 illustrating the hose as formed by the method of FIG. 5 and employing a strip of pliable material as shown in FIG. 6.

The hose 20A of FIG. 7 is made from a helically wound strip 23A comprised of a flat side portion 25A and a convoluted side portion 26A which has an integral convolution 27A therein and the convoluted side portion 26A also has a second bead 44A which extends in parallel relation along the convoluted side portion 26A with a bead 31A thereof. The bead 44A has a solid semicircular cross section as will be readily apparent from the showing at 45A in FIG. 6 of the drawings and the hose 20A is made employing method steps very similar to the method steps illustrated in FIG. 3 and described in connection with the hose 20.

In particular, an extrusion apparatus similar to the extrusion apparatus 41 is employed to define an extruded strip 23A and a rotatable mandrel 42 is also employed to provide helical winding in a manner as previously described with adjoining turns of strip 23A having portions indicated at 24A in FIG. 7 in overlapping relation while disposing the reinforcing wire 21A in sandwiched relation between the portions in overlapping relation so as to define hose 20A having the wire 21A helically wrapped therewithin. It will also be seen that due to the provision of the integral bead 44A of solid semicircular cross section, the hose 20A has the bead 44A also extending in a helical path as a second integral helical bead along the hose 20A and comprising the outside surface of such hose.

Figure 8:
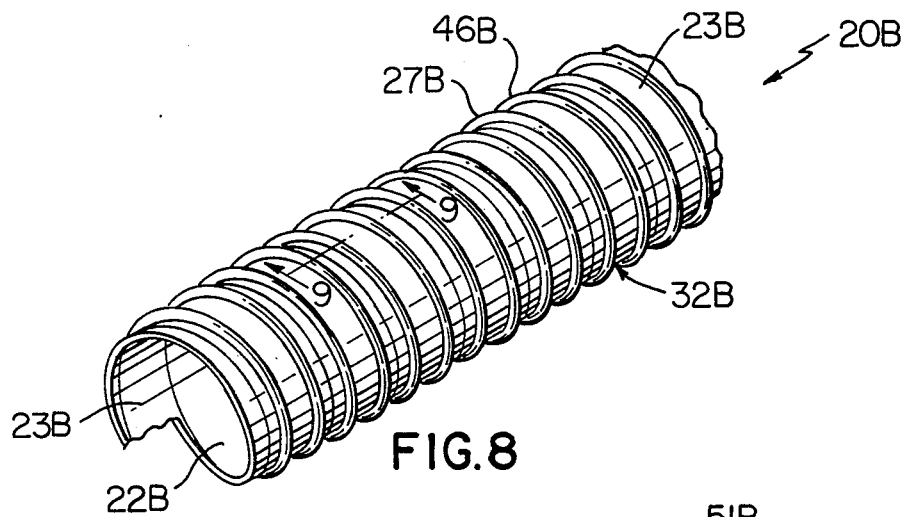
FIG. 8 is a fragmentary perspective view illustrating another exemplary embodiment of the wire-reinforced hose of this invention.
Figure 10:
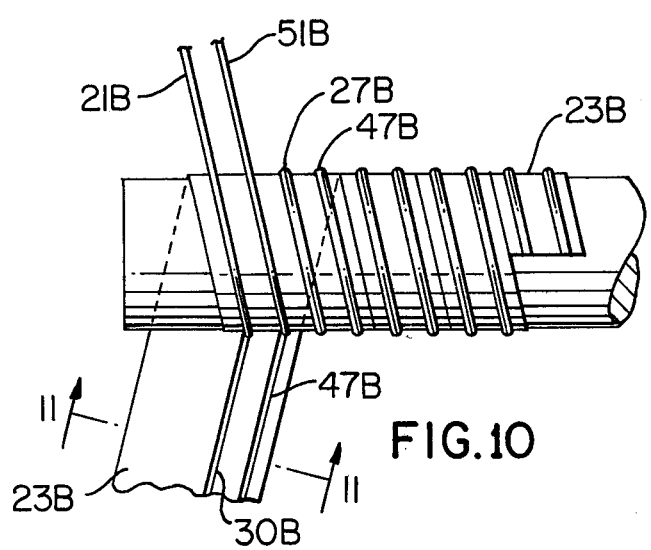
FIG. 10 is a view similar to FIGS. 3 and 5 illustrating the method which may be employed in forming the hose of FIG. 8.
Figure 9:
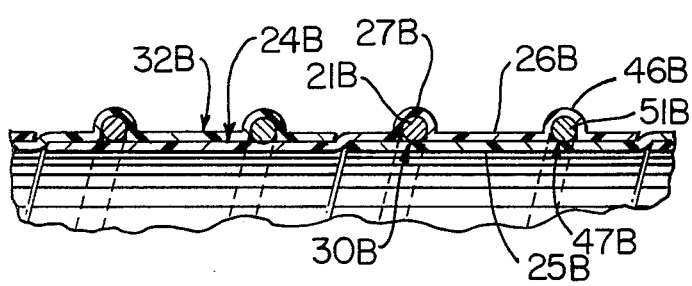
FIG. 9 is an enlarged fragmentary cross-sectional view taken essentially on the line 9—9 of FIG. 8.
Figure 11:
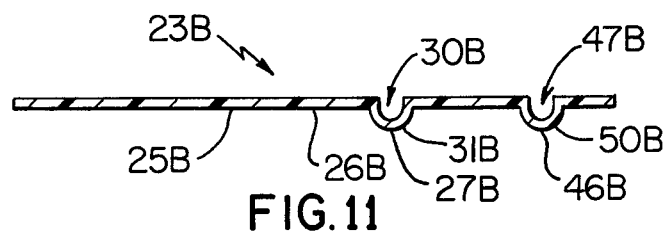
FIG. 11 is a cross-sectional view taken on the line 11—11 of FIG. 10.

The hose 20B of FIGS. 8-9 is comprised of a helically wound strip 23B of pliable material and such strip is shown in detail in FIG. 11. The strip 23B also has a flat side portion 25B and a convoluted side portion 26B which has an integral preformed convolution 27B therein. However, in addition to the convolution 27B the convoluted side portion 26B has a second convolution 46B defining a second groove 47B relative to one surface of the strip 23B and a second bead 50B relative to the opposite surface or the surface defining the outside surface 32B of the hose 20B.

The hose 20B has a wire 21B disposed within the groove 30B of its convolution 27B and has a second wire 51B disposed within the groove 47B of the second convolution 46B. The hose 20B is made in a similar manner as the hose 20 and 20A employing a rotatable mandrel 42 and the strip 23B is preferably defined by extrusion process employing a modified extrusion apparatus similar to the apparatus 41 and modified to define the second convolution 46B in the convoluted side portion 26B.

Upon helically winding the strip 23B, the second bead 50B also defines an integral helical bead along the axial length of the hose 20B parallel to the bead 31B and the strip is wound to define overlapping portions as shown at 24B in FIG. 9 and with the overlapping portions being defined by the convoluted side portion 26B disposed in helically wound relation against the flat side portion 25B. With this helical winding both wires 21B and 51B are sandwiched between the overlapped portions with the second wire 51B disposed in the second groove 47B whereby the hose 20B also has a substantially smooth inside surface 22B defined solely by adjoining turns of the flat side portion 25B and with not only the first wire 21B being concealed when viewing the inside surface 22B but also the second wire 51B being concealed.

Wires 21, 21A, and 21B may be made of any suitable material employed in the art for this purpose and preferably such wires are made of a metallic material. However, it will be appreciated that, if desired, such wires may be made of a non-metallic material such as a comparatively rigid plastic material which is capable of being helically wound on a mandrel such as a rotatable mandrel 42, for example.

Figure 12:
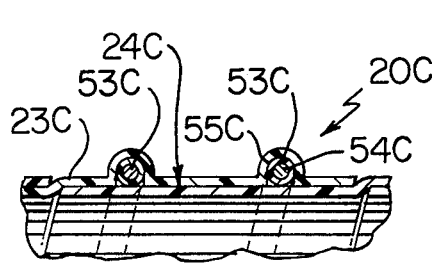
FIG. 12 is a view similar to FIG. 9 illustrating another exemplary embodiment of the hose of this invention in the form of a modification of the hose of FIG. 8.

The exemplary hose 20C of FIG. 12 is made employing a helically wound strip 23C which is substantially identical to the strip 23B comprising the hose 20B. The only difference between the hose 20C and the hose 20B is that the hose 20C employs a plurality of two wires in the form of dual-purpose wires each designated by the same reference numeral 53C for convenience. Each wire 53C serves the dual-purpose of reinforcing wire and electrical conductor; and, each wire 53C is comprised of a metal electrically conducting and reinforcing central portion 54C which has a protective sleeve 55C disposed concentrically therearound with each sleeve 55C being made of an electrically insulating polymeric material. It will also be appreciated that the hose 20C is made in a substantially identical manner as the hose 20B employing an extrusion apparatus to define strip 23C, a mandrel similar to mandrel 42, and in general method steps similar to the method steps of the hose 20B, 20A, and 20.

The thickness of the polymeric material employed to define the strip which is helically wound, whether it be strip 23, 23A, 23B, or 23C may be any suitable thickness and the overall width of each of such strips defined by the combined width of the flat side portion and convoluted side portion will vary depending upon the application of the hose and the desired size of such hose.

In addition, it will also be appreciated that the wire, whether metallic wire, non-metallic wire, or dual-purpose wire serving as reinforcement and electrical conductor may be of any suitable outside diameter depending upon the application requirements of the particular hose and the desired size thereof.

In each example of the hose of this invention disclosed herein a wire of circular cross section is illustrated and described; however, it is to be understood that the wire whether of metallic or non-metallic material may be of any desired cross-sectional configuration known in the art including not only circular but polygonal, elliptical, or other shape.

Reference has been made in this disclosure of the invention to the fact that the EPDM rubber is of the type which is an ambient air cured rubber. This reference to ambient air curing has been presented to indicate curing will occur comparatively rapidly at ambient air temperatures without special or additional process steps. The ambient air temperatures which are referred to will vary depending upon the location of the hose manufacturing facility; however, basically such temperatures are usually in the temperature range of 60° to 80° F.

In this disclosure reference has been made to the utilization of EPDM rubber to define the strip material which is helically wound to define the hose of this invention. However, it is to be understood that any suitable material may be employed for this purpose which is capable of being preformed such as to define a flat or straight side portion and an adjoining convoluted side portion. The convoluted side portion may comprise one or more U-shaped convolutions and one or more solid beads in the strip material to be helically wound. The U-shaped convolutions enable the helical winding of one or more wires, whether sleeve covered or not, along a mandrel with optimum simplicity and with assurance that each of such wires is nested within an associated convolution and the resulting hose has wire-reinforcement disposed in a helical path which is a precise path and which will not vary with further processing of the hose. Further, the helical path will not be dislodged or changed during use of the hose.

In the formation of the hose of this invention the helical winding of a strip which is self curing at ambient temperatures also has the inherent advantage of providing self adhesion of the adjoining turns which are disposed in overlapping relation. However, if desired adhesive means may be disposed between the portions in overlapping relation at 24 for hose 20, 24A for hose 20A, 24B for hose 20B, and 24C for hose 20C.

As previously mentioned each hose of this invention is preferably made employing a polymeric material preferably in the form of EPDM rubber and various rubbers of this type are commercially available.

While present exemplary embodiments of this invention, and methods of practicing the same, have been illustrated and described, it will be recognized that this invention may be otherwise variously embodied and practiced within the scope of the following claims.

What is claimed is:

1. In a wire-reinforced hose defined by a helically wound strip of pliable material which has adjoining turns thereof with portions in overlapping relation and a reinforcing wire sandwiched between said portions, the improvement wherein said pliable material is a strip of polymeric material having a flat side portion adjoined by a convoluted side portion which has an integral preformed convolution therein, said convolution defining a groove relative to one surface of said strip and a bead relative to an opposite surface thereof, said wire being disposed in said groove with said strip in its helically wound relation with said bead defining an integral helical bead along said hose, said overlapping portions being defined by said convoluted side portion disposed in wound relation against said flat side portion with said wire sandwiched therebetween and disposed in said groove to thereby define said hose having a substantially smooth tubular inside surface defined solely by adjoining turns of said flat side portion with said wire being concealed when viewing said tubular inside surface, said preformed convolution having a roughly U-shaped cross-sectional configuration defined by a bight and a pair of legs extending in parallel relation from opposite ends of said bight, said legs having inside surfaces which define corresponding surfaces of said groove and said inside surfaces engage said wire and hold same in a precise helical path.

2. A hose as set forth in claim 1 wherein said overlapping portions are self bonded together.

3. A hose as set forth in claim 1 wherein said strip defining said hose consists entirely of a polymeric material.

4. A hose as set forth in claim 3 wherein said polymeric material is a self-cured material having been self cured at normal ambient temperatures.

5. A hose as set forth in claim 3 in which said strip has a uniform thickness throughout including said flat side portion and said convoluted side portion with its preformed convolution.

6. A hose as set forth in claim 5 in which said strip is a preformed strip defined by extrusion process.

7. A hose as set forth in claim 3 in which said convoluted side portion of said strip has a second bead of solid semi-circular cross section extending in parallel relation along said convoluted side portion with said first-named bead, said second bead defining a second integral helical bead along said hose.

8. A hose as set forth in claim 1 in which said wire is a metal wire.

9. A hose as set forth in claim 1 in which said wire is made of a non-metallic material.

10. In a wire-reinforced hose defined by a helically wound strip of pliable material which has adjoining turns thereof with portions in overlapping relation and a reinforcing wire sandwiched between said portions, the improvement wherein said pliable material is a strip of polymeric material having a flat side portion adjoined by a convoluted side portion which has an integral preformed convolution therein, said convolution defining a groove relative to one surface and a bead relative to an opposite surface thereof, said wire being disposed in said groove with said strip and its helically wound relation with said bead defining an integral helical bead along said hose, said overlapping portions being defined by said convoluted side portion disposed in wound relation against said flat side portion with said wire sandwiched therebetween and disposed in said groove to thereby define said hose having a substantially smooth tubular inside surface defined solely by adjoining turns of said flat side portion with said wire being concealed when viewing said tubular inside surface, a second integral preformed convolution in said convoluted side portion, said second convolution defining a second groove relative to one surface and a second bead relative to an opposite surface, and a second wire disposed in said second groove with said strip in its helically wound relation, said second bead also defining an integral helical bead along said hose parallel to said first-named bead, said overlapping portions defined by said convoluted side portion disposed in wound relation against said flat side portion also having said second wire sandwiched therebetween and disposed in said second groove to thereby assure said hose has said substantially smooth tubular inside surface defined solely by adjoining turns of said flat side portion with said second wire also being concealed when viewing said tubular inside surface, each of said preformed convolutions having a roughly U-shaped cross-sectional configuration defined by a bight and a pair of legs extending in parallel relation from opposite ends of said bight, said legs of each convolution having inside surfaces which define corresponding surfaces of an associated groove and the inside surfaces engage an associated wire and hold same in a precise helical path.

11. A hose as set forth in claim 10 in which each of said wires is made of a metallic material and has a polymeric sleeve disposed therearound, each of said wires serving the dual-purpose of reinforcing wire and electrical conductor.

* * * * *

UNITED STATES PATENT OFFICE
CERTIFICATE OF CORRECTION

Patent No. 4,203,476              Dated  May 20, 1980

Inventor(s) Frank A. Vitellaro

It is certified that error appears in the above-identified patent and that said Letters Patent are hereby corrected as shown below:

Column 3, line 41, "32" should be -- 23 --.

Signed and Sealed this

Twenty-ninth Day of July 1980

[SEAL]

Attest:

SIDNEY A. DIAMOND

*Attesting Officer*    *Commissioner of Patents and Trademarks*